A. L. REGAN.
TOW ROPE.
APPLICATION FILED AUG. 10, 1921.
1,421,026. Patented June 27, 1922.
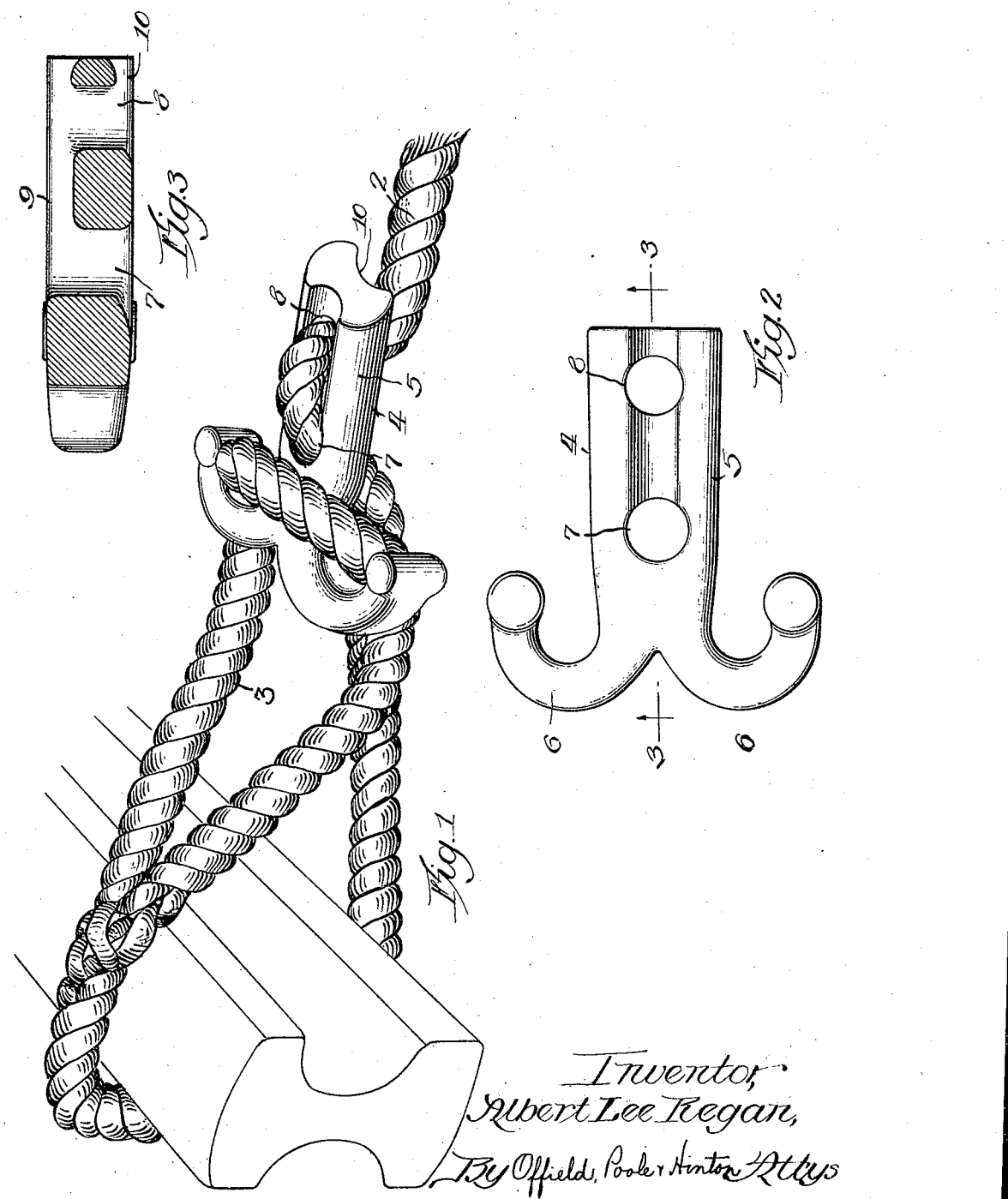
Inventor,
Albert Lee Regan,
By Offield, Poole & Hinton Attys

UNITED STATES PATENT OFFICE.

ALBERT LEE REGAN, OF XENIA, OHIO, ASSIGNOR TO THE HOOVEN & ALLISON COMPANY, OF XENIA, OHIO, A CORPORATION OF OHIO.

TOWROPE.

1,421,026.

Specification of Letters Patent. Patented June 27, 1922.

Application filed August 10, 1921. Serial No. 491,153.

*To all whom it may concern:*

Be it known that I, ALBERT LEE REGAN, a citizen of the United States, and a resident of Xenia, in the county of Greene and State of Ohio, have invented certain new and useful Improvements in Towropes, of which the following is a specification.

This invention relates to tow ropes such as may be used for automobiles and the like, and has for its object to produce an efficient towing device, capable of being quickly attached and detached from an automobile, and one in which the length of the tow rope may be readily changed so as to suit varying conditions.

In the drawings—

Fig. 1 is a perspective view of the tow rope as applied to an automobile axle,

Fig. 2 is a plan view of a cleat forming part of the tow rope, and

Fig. 3 is a longitudinal cross section of the cleat taken on line 3, 3 of Fig. 2.

The tow rope comprises a rope 2, preferably of fibrous nature, provided at its free end with an eye 3, and carrying a cleat or toggle 4 on an intermediate portion thereof. The toggle 4 comprises a shank 5, having a pair of laterally extending hooks 6, 6 integral therewith, and provided with two longitudinally spaced apertures 7 and 8. A groove 9 is preferably provided on one side of the shank 5 between the apertures 7 and 8, and a second groove 10 is formed on the opposite side of the shank between the rear aperture 8 and the rear end of the shank. An intermediate portion of the rope is threaded through the apertures 7 and 8. When under tension, the rope fits in grooves 9 and 10.

The rope is applied to the automobile in the manner illustrated in Fig. 1, in which it will be seen that the free end of the rope is passed about the axle and the loop 3 is engaged with the hooks 6, 6 on the cleat 4. Upon application of tension to the rope the cleat is held firmly so that it cannot slip on the rope. The rope fits snugly into grooves 9 and 10 so as to be protected from abrasion while in use. The cleat does not tilt on the rope so as to cause the injury and wear thereon.

When tension on the rope is relieved the looped end 3 may be readily disengaged from the cleat. The cleat may be moved to any desired position on the rope so as to vary the length of the rope.

Having described my invention, I claim—

1. In a tow rope, a cleat comprising two oppositely disposed, laterally extending curved hooks, a shank integral with said hooks, and having a pair of longitudinally spaced apertures therethrough, and a rope having an intermediate portion threaded through said apertures and provided with a looped end adapted to engage said hooks.

2. In a tow rope, a cleat comprising a pair of oppositely disposed, laterally extending hooks, a shank integral with said hooks, and having a pair of longitudinally spaced apertures therethrough, and provided with a groove connecting said apertures on one side of said shank and a second groove extending rearwardly from the rearmost aperture on the opposite side of said shank, and a rope having a looped end adapted to engage said hooks, and an intermediate portion threaded through said apertures and fitting in said grooves.

In witness whereof, I hereunto subscribe my name this 5th day of August, A. D. 1921.

ALBERT LEE REGAN.